(12) United States Patent
Snyder et al.

(10) Patent No.: US 11,235,788 B2
(45) Date of Patent: Feb. 1, 2022

(54) WAYSIDE RAILWAY SENSOR PACKAGE AND METHOD FOR APPLICATION

(71) Applicant: UNION PACIFIC RAILROAD COMPANY, Omaha, NE (US)

(72) Inventors: Todd Snyder, Omaha, NE (US); Evan Milton, Omaha, NE (US); James McDaniel, Omaha, NE (US); Thomas Bartlett, Omaha, NE (US); Zach Royer, Omaha, NE (US)

(73) Assignee: UNION PACIFIC RAILROAD COMPANY, Omaha, NE (US)

( * ) Notice: Subject to any disclaimer, the term of this patent is extended or adjusted under 35 U.S.C. 154(b) by 178 days.

(21) Appl. No.: 16/363,844

(22) Filed: Mar. 25, 2019

(65) Prior Publication Data

US 2020/0023871 A1 Jan. 23, 2020

Related U.S. Application Data (60) Provisional application No. 62/647,445, filed on Mar. 23, 2018.

(51) Int. Cl.
*B61L 27/00* (2006.01)
*B61L 25/02* (2006.01)
*B61L 15/00* (2006.01)

(52) U.S. Cl.
CPC ......... *B61L 27/0038* (2013.01); *B61L 25/025* (2013.01); *B61L 27/0077* (2013.01); *B60L 2200/26* (2013.01); *B61L 15/0027* (2013.01); *B61L 2205/04* (2013.01)

(58) Field of Classification Search
CPC ............. B61L 27/0038; B61L 27/0077; B61L 25/025; B61L 15/027; B61L 2200/26; B61L 2205/04
See application file for complete search history.

(56) References Cited

U.S. PATENT DOCUMENTS

| | | | | |
|---|---|---|---|---|
| 3,941,338 A * | 3/1976 | Knudsen | ................... | B61L 1/16 246/77 |
| 4,128,218 A * | 12/1978 | Pohlig | .................... | B61L 1/161 246/247 |
| 4,200,855 A * | 4/1980 | Gilcher | .................... | B61K 9/12 246/249 |
| 4,283,031 A * | 8/1981 | Finch | ........................ | B61L 1/10 246/128 |
| 5,129,606 A * | 7/1992 | Rodems | ................... | B61K 9/04 246/247 |
| 6,371,417 B1 * | 4/2002 | Southon | .................. | B61L 1/165 246/247 |

(Continued)

*Primary Examiner* — Jason C Smith
(74) *Attorney, Agent, or Firm* — Kutak Rock LLP (57) ABSTRACT

A wayside railway sensor package is provided to detect railway wheels for the purposes of assessing the speed and direction of a train in order to align any measured characteristic on said moving train with the proper vehicle. The stand-alone package is easily installed in the web of the rail using standard tools. When used in combination with recent processing techniques, the package can be used to replace one or more components or subsystems on all common wayside detectors while also providing enhanced capabilities and improved reliability. The package also contains sensors that provide data used for assessing additional rail, wheel, and vehicle conditions directly.

13 Claims, 5 Drawing Sheets

(56) References Cited

U.S. PATENT DOCUMENTS

| | | | |
|---|---|---|---|
| 7,216,558 B2* | 5/2007 | Kumar | B61L 1/02 |
| | | | 73/866.5 |
| 9,434,014 B1* | 9/2016 | Krueger | B23D 41/08 |
| 2001/0032513 A1* | 10/2001 | Havira | B61K 9/10 |
| | | | 73/636 |
| 2009/0084197 A1* | 4/2009 | Lohr | G01L 5/0004 |
| | | | 73/862.627 |
| 2009/0282923 A1* | 11/2009 | Havira | G01N 29/2493 |
| | | | 73/636 |
| 2017/0138805 A1* | 5/2017 | Jiang | G01M 5/0025 |
| 2018/0283980 A1* | 10/2018 | Arostegui Camacho | |
| | | | G01M 5/0041 |
| 2019/0293606 A1* | 9/2019 | Lenkin | G01N 29/28 |
| 2020/0023871 A1* | 1/2020 | Snyder | B61L 25/025 |
| 2020/0217020 A1* | 7/2020 | Johnston | H05B 6/40 |
| 2020/0231194 A1* | 7/2020 | Schicker | G01M 5/0025 |
| 2020/0339167 A1* | 10/2020 | Liu | B61L 23/047 |
| 2021/0122401 A1* | 4/2021 | Aaroe | B61L 25/025 |

* cited by examiner

WAYSIDE RAILWAY SENSOR PACKAGE AND METHOD FOR APPLICATION

CROSS-REFERENCE TO RELATED APPLICATIONS

This application claims priority to U.S. Provisional Patent Application Ser. No. 62/647,445, filed on Mar. 23, 2018, and titled, "Wayside Railway Sensor Package and Method for Application.

BACKGROUND OF THE INVENTION

The present disclosure relates generally to the field of remote railway monitoring systems, or wayside detectors. In particular, the present disclosure relates to rail-bound sensors used for sensing wheels and performing diagnostic functions on a moving train, either directly or as a part of a broader system.

There are thousands of remote railway installations that diagnose or measure useful characteristics of trains. These installations are generally referred to as wayside detectors. Some common wayside detectors include bearing and wheel temperature detectors, automated equipment identification detectors, dragging equipment detectors, wheel profile detectors, bearing acoustic detectors, and machine vision detectors.

Most wayside detectors sense the wheels on a train for purposes of indicating the presence of a train and counting wheels. More complex detector systems determine the direction and speed of movement. Determining train presence is necessary for things like initialization of the system, opening protective shutters, activation of safety sensitive functions, and other similar operations. Accurate wheel counting, speed, and direction enable more complex functions for uniquely identifying the individual vehicles that pass the site. Unique vehicle identification enables the measured characteristics to be associated with the correct vehicle for automated and efficient handling of any defects, or for the purpose of tracking such measurements over time to assess any changes that may be useful in diagnosing problems.

DESCRIPTION OF PRIOR ART

Hall Effect, Eddy Current, or otherwise magnetically or inductive principled devices such as described in U.S. Pat. Nos. 3,941,338, 4,128,218, 7,216,558 and the like are the mainstay for most wayside detectors. A drawback of such approaches is that they generally require placement and mounting techniques that place them in harm's way in close proximity to the wheel flange. Wheels with high flanges are especially destructive to many of these arrangements and wheels that are laterally shifted or containing thin flanges create geometries that are more difficult to detect reliably. In addition, the high vibration environment has proven to be very challenging for any of the methods of mechanical attachment. Furthermore, wear of the rail head causes inherent geometric changes over time that require adjustments or more complex designs that can accommodate such variation.

U.S. Pat. No. 5,129,606, discloses a sensor system for detection of train wheels over travelling a section of rail. Various embodiments disclosed provide for a sensor positioned on a plate attached to the rail base. Such a configuration overcomes the placement issues of the prior sensors that detect wheel flanges. However, two such devices are required to determine train direction and speed and this alternative placement does present interference issues with the ballast and several of the track maintenance equipment activities.

Railway sensors have previously been disclosed including strain sensors positioned within the web of a rail. Such sensors have included the bolt-like railway vehicle wheel detector described in U.S. Pat. No. 4,200,855. This wheel detector and others employ two or more sensors positioned at a distance from each other selected to facilitate detection of wheels passing by and the direction of travel. This device has the benefit of the least obtrusive placement, but it does require a specialized installation method with tapered tooling. A very similar reverse taper device is described in Patent Publication No. US2009/0084197 and provides for adaptation to a standard hole with some variation, but the extreme vibration and high strains of the heavy haul freight railroads severely limit the survivability of any device with components that can move with respect to one another.

In each of the aforementioned devices, the requirement of two sensors working in tandem has resulted in a less robust system. Also, each device suffers from the methods of mechanical affixation surviving high vibration environments. Each of the devices also have limitations in their capabilities to exploit additional diagnostic capabilities.

Accordingly, it is an advantage of the present disclosure to provide the capability of obtaining sufficient diagnostic data from a single sensor package installation deployed in the least obtrusive position with a simple and robust installation methodology.

DETAILED DESCRIPTION

Figure 1:
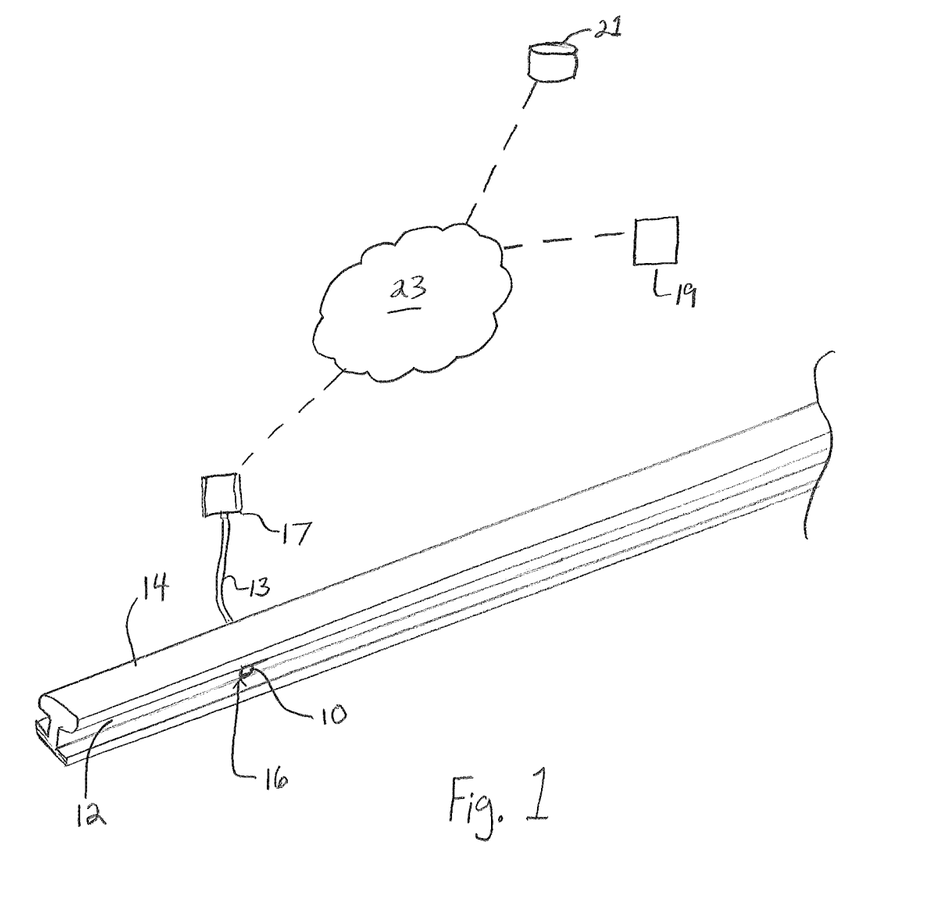
FIG. 1, is a system Block Diagram for sensor package in rail.
Figure 2A:
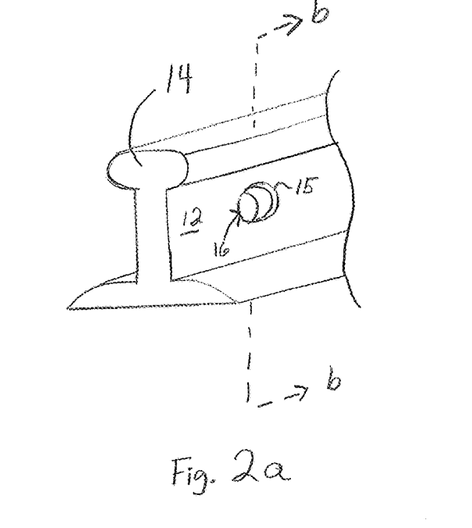
FIG. 2*a* is a perspective view of a rail having for use with a sensor package.
Figure 2B:
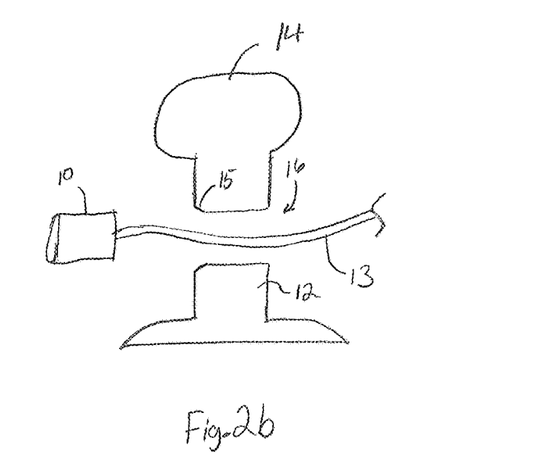
FIG. 2*b* is a cross-sectional view of a rail showing the positioning of a sensor package.
Figure 2C:
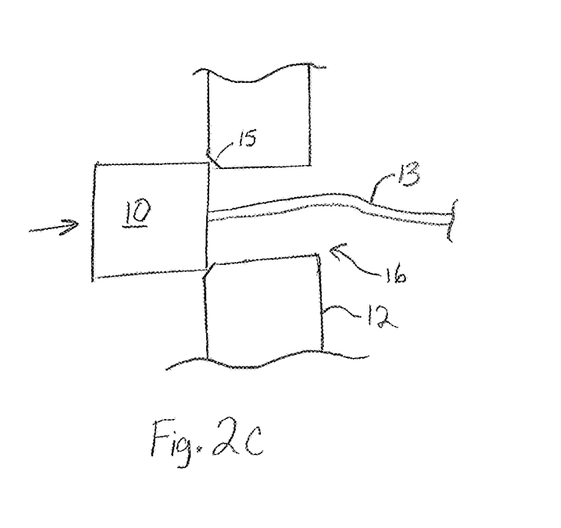
FIG. 2*c* is another a cross-sectional view of a rail showing the positioning of a sensor package.
Figure 2D:
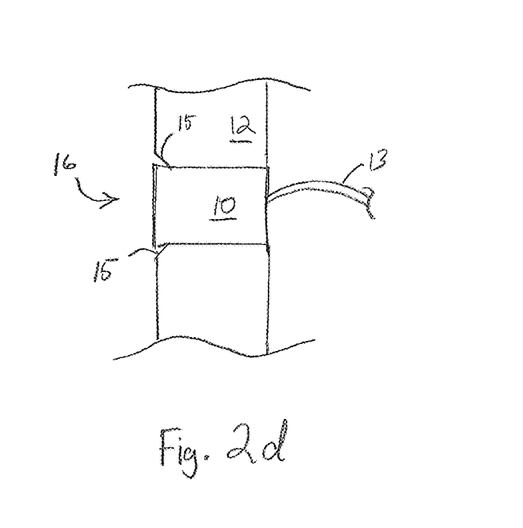
FIG. 2*d* is another a cross-sectional view of a rail showing the positioning of a sensor package.

Referring to the Figures, and in accordance with the goal of providing a simple installation process, FIGS. 1 and 2 illustrate sensor package 10 in the web 12 of a rail 14, and a method for mounting the same. The rail 14 may have a hole 16 drilled in the web 12 where the size of the hole may be similar to the holes used for applying joint bars. A drill and bit capable of achieving a nominal tolerance of +/−0.005" (such as a Trak-star RM42 with Twister bits) may be used to assure proper installed performance. The hole 16 in rail 14 may be deburred and chamfered to provide a chamfer surface 15. In some embodiments, chamfering to about 1/16" is preferred. The sensor package 10 may have a generally cylindrical surface (the barrel 18) that mates with hole 16 in the rail 14 and provides an interference fit. The sensor package barrel 18 and membrane 20 may be manufactured as a single piece from a fairly compliant material, such as a polymer. The polymer may be any suitable material. In some embodiments, the polymer may be selected from those with preferred properties of:

Modulus of elasticity less than about 20 Gpa
Thermal coefficient of expansion less than about 100e-6
Tensile strength greater than about 50 N/mm^2
Notched impact strength greater than about 5 Kj/m^2
Glass transition temperature greater than about 80 C The outer dimensions of the sensor package barrel 18 may have a slight taper to assist with initial placement in hole 16 and may be from at least about 0.005" larger in diameter than the maximum nominal hole diameter. In some embodiments, the outer dimensions of the sensor package barrel 18 may have a slight taper to assist with initial placement in hole 16 and may be from at least about 0.010" larger in diameter than the maximum nominal hole diameter. While shown as a round opening, the hole could be of another shape to control sensor orientation, provide different signal profiles, and/or for other purposes.

The sensor package 10 may be positioned in hole 16 and then pressed or tapped or hammered into the hole 16 until the gauge-side surface 22 is generally flush with the web 12. In some embodiments, the barrel 18 taper may be omitted, in particular, if the hole in the rail web has been sufficiently chamfered.

The sensor package 10 may contain a strain sensing device such as a strain gauge. The sensor package 10 may contain other sensors besides a strain sensing device. The sensor package 10 may have supporting circuitry installed inside the package 10. The sensor package may have be configured to pass sensor signals to a remote computing device.

Sensor package 10 may be positioned in the web 12 of rail 14 to provide in-rail sensing. The sensor package 10 may include a strain sensor 24 such as a resistive sensor, a piezoelectric sensor, a fiber optic sensor, or the like. Such sensors produce a signal in response to forces acting on the rail.

Figure 3:
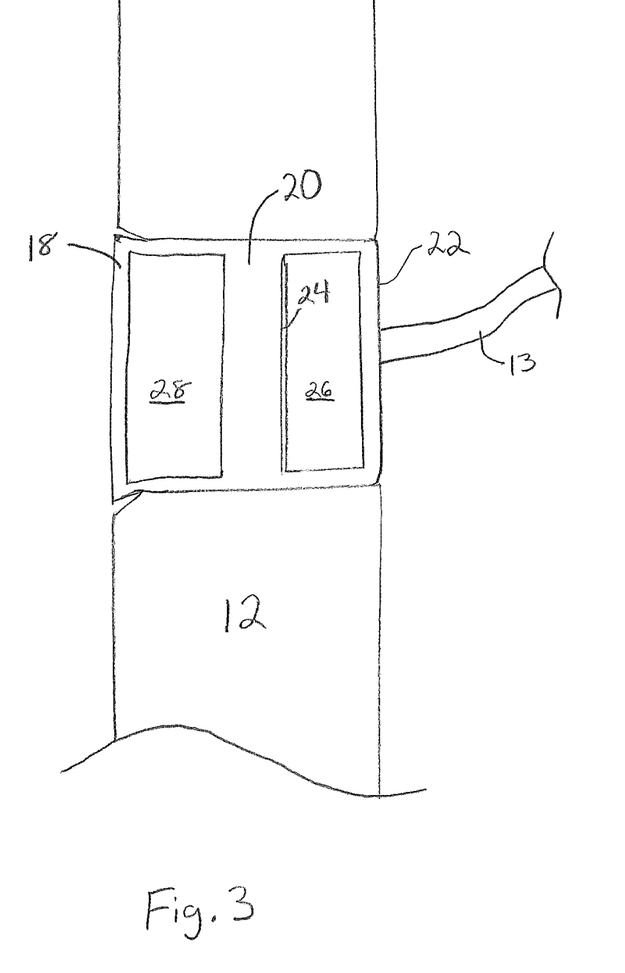
FIG. 3 is a cross-sectional view of a sensor package in rail.

Referring to FIG. 3, a sensor package 10 suitable for placement in the web 12 of a railway rail 14 includes a barrel 18 housing one or more sensors 24. The barrel 18 may have a generally 'H'-shaped longitudinal cross-section. A membrane 20 may be manufactured with the barrel as a single piece from a polymer. The membrane may form the bisectional portion of the 'H'-shaped longitudinal cross-section. An electronic coupling 13 may be provided to put the sensor package 10 in communication with a local processor 17 that may include a computer, router, or other means for communicating with a networked computer 19 configured to monitor one or more sensor packages 10. In such embodiments, a wide area network, local area network or other network 23 may be configured to place local processor 17 in communication with computer 19 and/or database 21 as shown in FIG. 1.

In some embodiments barrel 18 may include a sensor cavity 26 and a second sensor cavity 28 for housing additional sensors.

Figure 4:
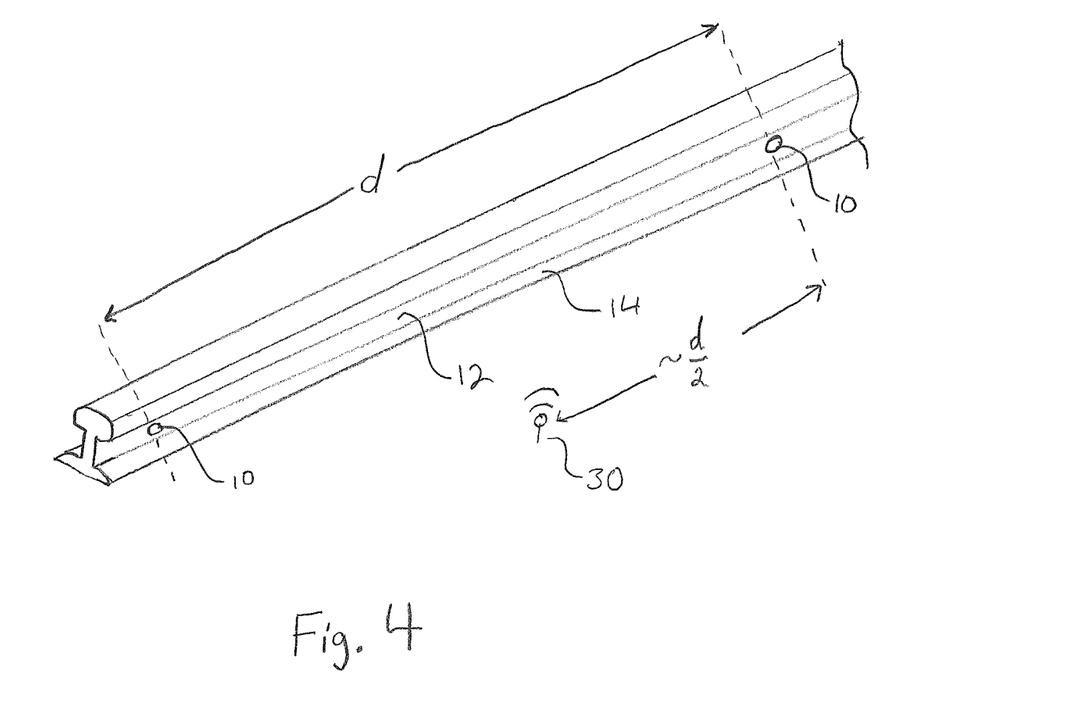
FIG. 4 is a side elevation view of a rail having two sensor packages.

Referring to FIG. 4, as a railway wheel passes over the rail proximate to the sensor, the signal from the sensor will increase to a peak that will correspond to the wheel's close proximity to the sensor. If the sensor is arranged to measure vertical shear strain, the peak will reverse its magnitude when the wheel passes to the other side of the sensor. The shape of such a signal is indicative of the direction of travel and the speed of the wheel. The magnitude of the signal is proportional to the wheel load exerted on the rail.

As a railway vehicle passes over a sensor, the output signal may be analyzed to determine the number and relative position and loading of the vehicle wheels. This information may be used to identify particular types and models of locomotives or freight cars. For example, a library of freight cars may include information regarding the number and spacing of axels and the distance between leading and trailing axels of adjoining coupled cars. Data collected from the sensor may be used to find matching configurations in the library.

In addition, the presently disclosed sensors and methods may be advantageously used in combination with sensor systems used for railcar diagnostics. For example, a signal from an in-rail sensor may be read to determine the number of cars in a train and at which position in the sequence of railcars comprising the train a particular rail car is a part of. This may be done by determining where clusters of axles are in close proximity as axles positioned at the rear of one railcar will be relatively close to the axles located at the front of the next railcar.

A number of in-transit diagnostic systems may be utilized in conjunction with the in-rail sensors. In such combinations, the in-rail sensor may be used to detect an approaching train and send a signal that results in the opening of a protective housing used to shield other sensors including lasers and cameras. Examples of such housings include those utilized for rail-side sensors as well as sensor groups positioned between rails for imaging the undercarriage of a railcar. Further, in such combinations, the use of the in-rail sensor to detect car type and model can be leveraged to correlate other data including imaging and diagnostics.

In some embodiments, a plurality of cameras and lasers may be used to create highly detailed images of railcar components. These images may be used by human users or computer software to detect defects in the components.

Data collected by the in-rail sensors may be utilized to determine the position of the relevant railcar in the train. This can be done by correlating the data generated by the sensor with that of the other sensors. The data from the in-rail sensor can be used to determine how many cars have passed by the other sensors at the point when the defect appeared. This can then be used to identify the position of the relevant railcar and increase the efficiency of the other sensors and diagnostic systems. Such diagnostic systems may include the Machine Vision system deployed by Union Pacific Railroad and described at https://www.up.com/aboutup/community/inside_track/research-development-8-9-2016.htm.

While other railcar identifying methods are known, such as radio frequency identification, these are dependent upon a number of transmitters with at least one mounted to each railcar, and receivers positioned to detect the transmitters. In use, there have been difficulties in reliable identification utilizing RFID. For example, when a train stops for a period of time, the RFID system may mistake the next passing transmitter as belonging to a different train. Additionally, in areas where parallel tracks are in use, receivers may not be able to distinguish which train a particular car is a part of. These reasons make it a necessity to have redundant or alternative systems to increase the reliability and confidence for verifying the train make-up perceived by other systems.

Figure 5:
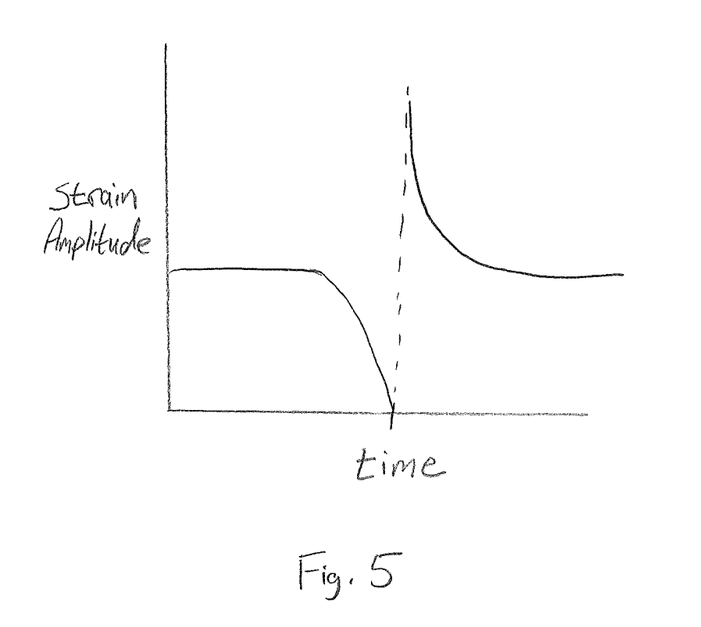
FIG. 5 is a representative graph of strain signals generated by a sensor package over time and showing the relative positions of a wheel to the sensor package.

While a single in-rail sensor may be sufficient for a number of applications, such as railcar type and model identification or determining the position of a particular railcar in a train, the inclusion of multiple sensors may be used to increase accuracy, through redundancy or by using alternative calculation methodologies. As shown in FIG. 5, in some embodiments, a plurality of sensors may be utilized. In some of these embodiments, two or more sensors may be spaced apart to permit a detection of a wheel passing over multiple points to calculate the wheel speed. This information can then be used to more accurately determine the spacing of wheelsets which, in turn, can more accurately identify the railcar type, model, and position in the train. As even more sensors are added, the speed and acceleration calculations can be further refined to allow for such scenarios as non-constant or non-linear acceleration of the railcar thus further improving the accuracy of the systems. A preferred method is to utilize the assumption that all wheels on a vehicle are moving at the same speed at any given point of time, along with an equation of motion that utilizes each wheel's passing time to perform a best fit to achieve the best determination of the equation of motion for that vehicle. Furthermore, with each additional new wheel indication, a calculation can be made to assess the likelihood that the new indication is in close agreement with the equation of motion, or is not in close agreement. When it is not in close agreement, the indication may be discarded or altered to produce a better result. It is also a preferred method to perform such calculations in a post processing technique when a near-real-time solution is not of high value.

A first embodiment of this invention provides a single sensor package installed in one rail of the track. The package contains a plurality of sensors that includes at least a strain gauge oriented to measure shear strain in the vertical plane of the web of the rail. Said package is connected to a cable that supplies electrical power and provides a path for analog and digital signals or data packets. The cable is connected to a device on the other end that communicates with the sensor package and ultimately to a data processing unit that may be local and/or in another remote location. In this configuration, the sensor package and supporting software provides a user with a train presence indication, a wheel counter, each wheel's speed, a load for each wheel on the instrumented rail, and an indication of the roundness of each wheel on the instrumented rail.

In a second embodiment, a dragging equipment sensor is utilized with clock that is suitably synchronized with the first embodiment, such as when both clocks have an NTP or GPS source, or in the case where the dragging equipment sensor is physically connected a device of the first embodiment and is utilizing that single clock. In this arrangement, an indication from the dragging equipment sensor indication is combined with the wheel count indication at substantially the same point in time to produce a dragging equipment alarm that carries with it the location in the train with respect to the wheels in said train.

In a third embodiment, a temperature measuring sensor is utilized in the same way as the dragging equipment sensor to produce data that is aligned with the location in the train with respect to the wheels. Other similar embodiments utilize cameras, microphones, other strain gauges, accelerometers, transducers, and the like.

In a fourth embodiment, the sensor package of the first embodiment contains within it an accelerometer and the data from the accelerometer is aligned in time with respect to the strain signal and any derived information such as the position in the train with respect to the wheels. Whether the accelerometer is contained within the sensor package of the first embodiment or in the case where the accelerometer data stream emanates from a separate source such as in the case of the third embodiment, the alignment of said data is possible. However, in this case of the fourth embodiment, additional benefit is gained if there is a need for near-real-time decisions and actions and when the transmission times can be reduced by having multiple sensors or data streams connected in a higher speed communications architecture.

A fifth embodiment contains the first embodiment and within close proximity there exists a radio frequency identification (RFID) antennae such as that used in an automatic equipment identification (AEI) system. The RFID antennae is attached to suitable electronics for rendering a message containing information read from an RFID tag along with a timestamp from a suitably synchronized clock source. In this embodiment, the train presence functionality may be used to activate the RFID system and also to provide a location along the train where said RFID tag was present.

In a sixth embodiment, and as shown in FIG. 5, a second wheel sensor package is added to the fifth embodiment. The two wheel sensors are placed in the rail along the direction of train travel, with one sensor package being upstream total separation distance (d) slightly greater than the maximum separation distance (I) that may be experienced between the closest wheels for any two vehicles in a train. In other words, this maximum separation distance is the span between the trailing wheel on a first vehicle and a leading wheel on a second vehicle separated by a long vehicle coupling apparatus. In this embodiment, there is improvement in the train presence indication which may now function to initialize the RFID antennae 30 electronics prior to an RFID tag on the train arriving at said RFID antennae. There is now also an improvement that has been made to enable the method of counting wheels entering and exiting a zone to determine if a train has stopped while a vehicle remains in said zone.

In a seventh embodiment the wheel sensor packages are installed in the same locations equidistant from the RFID antennae, but the sensor packages are intentionally installed on opposite rails. There is now an additional benefit that the load measuring ability can be used to compare the wheel weights on one side of the train with the wheel weights on the other side of the train. Such a comparison can be utilized to indicate whether a vehicle is balanced or whether the said vehicle might contain a condition where the load has shifted.

In an eighth embodiment, there exists an accelerometer or other vibration measuring sensor in the sensor packages of embodiment seven. There is now an additional benefit for a extended monitoring of the interaction between the rail and the wheels on both side of the train that provides a measure of wheel rotundity.

In a ninth embodiment, there is a thermocouple or other temperature measuring sensor in the sensor packages of embodiment 7. There is now a benefit of assessing each rail temperature for the purpose of estimating risks from rail thermal expansion.

In a tenth embodiment, there exists six or some other plurality of wheel sensor packages dispersed along the rail in a zone similar to that of embodiment seven. Such an embodiment provides the benefits of the other aforementioned embodiments and also an extended level of reliability due to redundancy. In addition, the distribution of wheel sensor packages along the rail avails abilities of more advanced mathematical algorithms for purposes of improving wheel speed and location estimates. Such advanced techniques lend themselves to improved alignment accuracy between train position and higher speed component output such as with those used for machine vision.

It should be clear to anyone skilled in the art that a single sensor package such as the one described herein is beneficial in an embodiment that replaces one or more sensors in existing wayside detectors. It should also be clear that additional sensor packages can be used for both improved overall reliability and extended abilities.

What is claimed is:

1. A sensor package suitable for placement in the web of a railway rail, the sensor package comprising:
   a barrel housing one or more sensors, the barrel having a generally 'H'-shaped longitudinal cross-section;
   the barrel housing further comprising a plurality of sensor cavities; and
   a membrane manufactured with the barrel as a single piece from a polymer, the membrane forming the bisectional portion of the 'H'-shaped longitudinal cross-section.

2. The sensor package of claim 1, wherein, the polymer has a modulus of elasticity less than about 20 Gpa.

3. The sensor package of claim 1, wherein, the polymer has a thermal coefficient of expansion less than about $10^{-6}$.

4. The sensor package of claim 1, wherein, the polymer has a tensile strength greater than about 50 N/mm$^2$.

5. The sensor package of claim 1, wherein, the polymer has a notched impact strength greater than about 5 Kj/m$^2$.

6. The sensor package of claim 1, wherein, the polymer has a glass transition temperature greater than about 80 C.

7. A railway rail comprising:
   a web portion; and
   a first sensor package, the sensor package having:
      a barrel housing one or more sensors;
      the barrel housing further comprising a plurality of sensor cavities;
      the barrel housing further comprising a generally 'H'-shaped longitudinal cross-section;
      a membrane, formed as a single part with the barrel; and
      a strain sensor configured to detect the presence and magnitude of a load on the rail.

8. The railway rail of claim 7, further comprising a second sensor package of similar design to that of the first sensor package.

9. A system for monitoring train travel over a railway rail comprising:
   a railway rail comprising:
   a web portion; and
   a first sensor package, the sensor package having:
      a barrel housing one or more sensors;
      the barrel housing further comprising a plurality of sensor cavities;
      the barrel housing further comprising a generally 'H'-shaped longitudinal cross-section;
      a membrane, formed as a single part with the barrel; and
      a strain sensor configured to detect the presence and magnitude of a load on the rail;
   a computer in communication with the first sensor over a network; and
   a processor configured to used data communicated from the sensor to determine a condition.

10. The system of claim 9, wherein the condition determined is a possible model or type of car that has passed over the first sensor package.

11. The system of claim 9, wherein the condition determined is the roundness of a wheel that has passed over the first sensor package.

12. The system of claim 9, further comprising a second sensor package located on a rail opposite the first sensor package.

13. The system of claim 12, wherein the condition determined is the balance of a load across a railcar axel.

* * * * *